United States Patent
Johnson

(10) Patent No.: US 9,238,928 B2
(45) Date of Patent: Jan. 19, 2016

(54) SAFER HINGE AND LATCH SYSTEM FOR LIVESTOCK ACCESS

(71) Applicant: Marting Manufacturing of Iowa, Inc., Alpena, MI (US)

(72) Inventor: Terry L. Johnson, Kanawha, IA (US)

(73) Assignee: Marting Manufacturing of Iowa, Inc., Alpena, MI (US)

( * ) Notice: Subject to any disclaimer, the term of this patent is extended or adjusted under 35 U.S.C. 154(b) by 0 days.

(21) Appl. No.: 14/159,502

(22) Filed: Jan. 21, 2014

(65) Prior Publication Data

US 2014/0202082 A1   Jul. 24, 2014

Related U.S. Application Data

(60) Provisional application No. 61/754,743, filed on Jan. 21, 2013.

(51) Int. Cl.
| | |
|---|---|
| *E05B 65/00* | (2006.01) |
| *E05D 7/10* | (2006.01) |
| *E05D 15/50* | (2006.01) |
| *E05D 3/02* | (2006.01) |

(52) U.S. Cl.
CPC .......... *E05B 65/0007* (2013.01); *E05D 7/1044* (2013.01); *E05D 15/502* (2013.01); *E05D 3/02* (2013.01); *E05Y 2201/218* (2013.01); *E05Y 2900/40* (2013.01); *Y10T 16/528* (2015.01)

(58) Field of Classification Search
CPC ....... E06B 11/00; E06B 11/02; E06B 11/021; E06B 11/022; E06B 11/023; E06B 11/025; E05D 7/1044
USPC .............. 49/381, 382, 383, 394, 399; 16/254, 16/231, 232, 86.1; 292/194, 195, DIG. 29, 292/230, 231
See application file for complete search history.

(56) References Cited

U.S. PATENT DOCUMENTS

| | | | | | |
|---|---|---|---|---|---|
| 32,990 | A | * | 8/1861 | Ellis | 292/230 |
| 265,838 | A | * | 10/1882 | Mancy | 49/201 |
| 625,057 | A | * | 5/1899 | Perkins | 292/230 |
| 1,179,852 | A | * | 4/1916 | Louden | 292/230 |
| 2,724,199 | A | * | 11/1955 | Pringle | 49/147 |

(Continued)

FOREIGN PATENT DOCUMENTS

| | | |
|---|---|---|
| CA | 1038673 | 9/1978 |
| CA | 2032295 | 3/1994 |

*Primary Examiner* — Katherine Mitchell
*Assistant Examiner* — Catherine A Kelly
(74) *Attorney, Agent, or Firm* — Warner Norcross & Judd LLP

(57) ABSTRACT

The gate latching device of this invention is optionally a one piece design, although it could be constructed by interconnecting several individual components. An alley post channel blank is formed in such a manner that it has protruding slotted tabs for bolting the post bracket to the floor. This feature allows the alley post bracket to be a direct replacement of the conventional post design for updating existing applications. The formed bracket is also optionally formed from one piece of steel and is provided with appropriate mounting holes installed. The formed bracket is optionally free from protruding tabs that can cause injury to personnel and livestock. A latch security plate activates automatically when the gate is closed. As soon as the gate is closed it is secure. The latch security plate can be applied in other applications, including wall brackets, feeder brackets, back to back brackets and other similar applications.

7 Claims, 6 Drawing Sheets

(56) References Cited

U.S. PATENT DOCUMENTS

| | | | |
|---|---|---|---|
| 3,030,717 A * | 4/1962 | Lewis | 49/193 |
| 4,176,869 A * | 12/1979 | Gilst | 292/304 |
| 5,860,250 A * | 1/1999 | Hill et al. | 49/397 |
| 8,104,432 B2 * | 1/2012 | Silvis et al. | 119/481 |

\* cited by examiner

SAFER HINGE AND LATCH SYSTEM FOR LIVESTOCK ACCESS

BACKGROUND OF THE INVENTION

The present invention relates to hinge and latch systems, and in particular to hinge and latch systems for livestock facilities.

In a typical livestock facility there are many swinging containment gates with latching devices attached to stationary posts, building walls or other stationary fixtures, which are components of containment pens or access ways, also known as alley ways, for facility personnel and livestock. Alley ways are used to move livestock from containment pens to other locations within the facility. The conventional design of a livestock gate latching device is mounted to a fixture and consists of several components that are welded together. Conventional gate latching devices may be interconnected to posts, gate ends, or brackets that may be attached to other stationary fixtures.

The conventional design of gate latching device components are individually manufactured and interconnected to a post, gate, or bracket by bolting, welding or other methods as a means to provide a secure gate latch. The conventional gate latching components have horizontal edges and corners which protrude outward from the vertical surfaces of the post, bracket, or other stationary fixture to which they are mounted. These protrusions have been found to cause personal injury to facility workers and lacerations or bruising to livestock.

Conventional gate latching devices use a security latch system which requires a formed angle security latch to be manually rotated away from the latch tabs before the gate can be inserted or removed from the latching device, and the formed angle security latch must be manually returned to its original position to prevent the gate from being opened by the livestock. If the formed angle security latch is not returned to its original position the gate could be easily opened again by livestock simply pushing up and out on the gate.

BRIEF SUMMARY OF THE INVENTION

A hinge and latch system is provided. The hinge and latch system includes a dual purpose connection, and in particular a hinged connection and a latched connection for a swinging gate, allowing the user to select the opening direction of the swinging gate. In some embodiments, the hinge and latch system are free from harmful protrusions that might otherwise extend into a gateway, for example a livestock gateway.

In one embodiment, the hinge and latch system includes a gate that is removably coupled to a vertical flange. The gate includes a hinge pin extending downwardly from the distal end of a striker plate. The vertical flange includes a horizontally recessed latch tab defining an aperture for receiving the hinge pin therein. The latch tab is integrally formed with the vertical flange, being bent horizontally from the vertical flange. The latch tab provides a bearing surface for the striker plate when the hinge pin is received in the latch tab aperture and when the gate is opened.

In another embodiment, the hinge and latch system include a self-locking latch security plate. The latch security plate is pivotably joined to the vertical flange above the striker plate. The latch security plate is suspended downwardly to obstruct removal of the hinge pin from the latch tab aperture. The latch security plate can be manually pivoted to allow removal of the hinge pin from the latch tab aperture. The self-locking latch security plate also permits the gate to be closed without manual manipulation of the latch security plate. As the gate is closed, the striker plate displaces the latch security plate, allowing the hinge pin to enter the latch tab aperture.

As set forth herein, the embodiments of the invention can minimize or eliminate portions of the latching device from protruding into a gateway, through which livestock and personnel would pass when the gate is open. The embodiments can include a formed steel construction which is integral to a bracket which may be mounted to a fixture. The lack of protrusions can reduce injuries to livestock and personnel. Additionally, the integrally formed steel construction can minimize or eliminate many individually manufactured components that would otherwise be assembled during the manufacturing process, although the present invention can be constructed using individually manufactured and interconnected components. The embodiments can also be configured to replace existing structures such as posts, wall brackets, feeder brackets, back to back brackets and other similar structures.

As also set forth herein, the embodiments can include a self-locking latch security plate to prevent the unintended opening of closed gates. The latch security plate is self-activated by a gate being closed, allowing a swinging gate to be closed without manual manipulation of the latch security plate. As soon as the swinging gate is closed it is secure, and the latch security plate prevents livestock from opening the swinging gate.

These and other features and advantages of the present invention will become apparent from the following description of the invention, when viewed in accordance with the accompanying drawings and appended claims.

Before embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

The current embodiments relate to a hinge and latch system including a dual purpose connection for a swinging gate. The hinge and latch system functions as both a latch and a hinge, allowing the user to select the opening direction of the swinging gate as desired. The hinge and latch system can replace existing gate structures for livestock containment, including structures such as posts, wall brackets, feeder brackets, back to back brackets and other structures.

Figure 1:
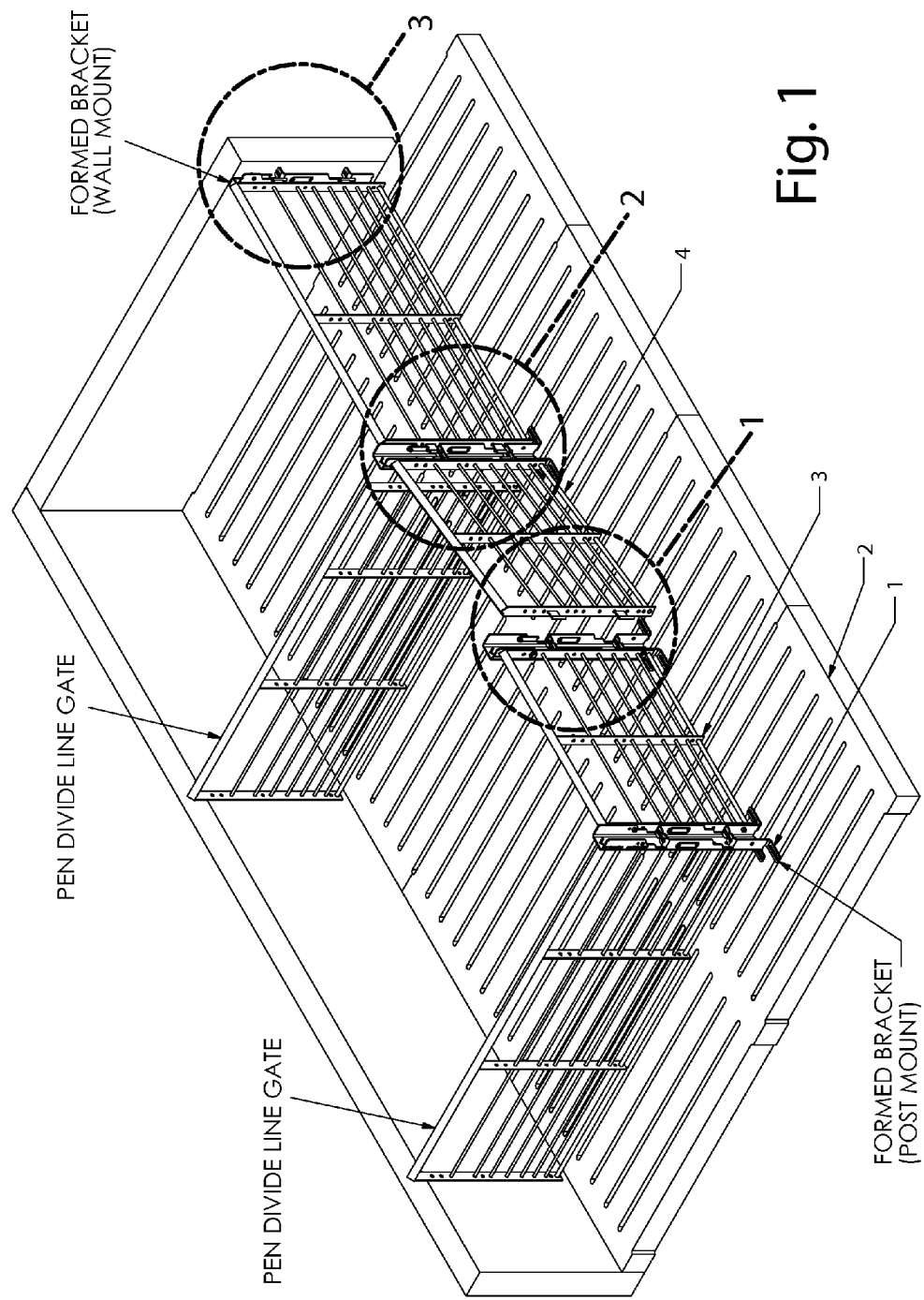
FIG. 1 is an isometric view of a gate containment system including a hinge and latch system in accordance with an embodiment of the present invention.
Figure 2:
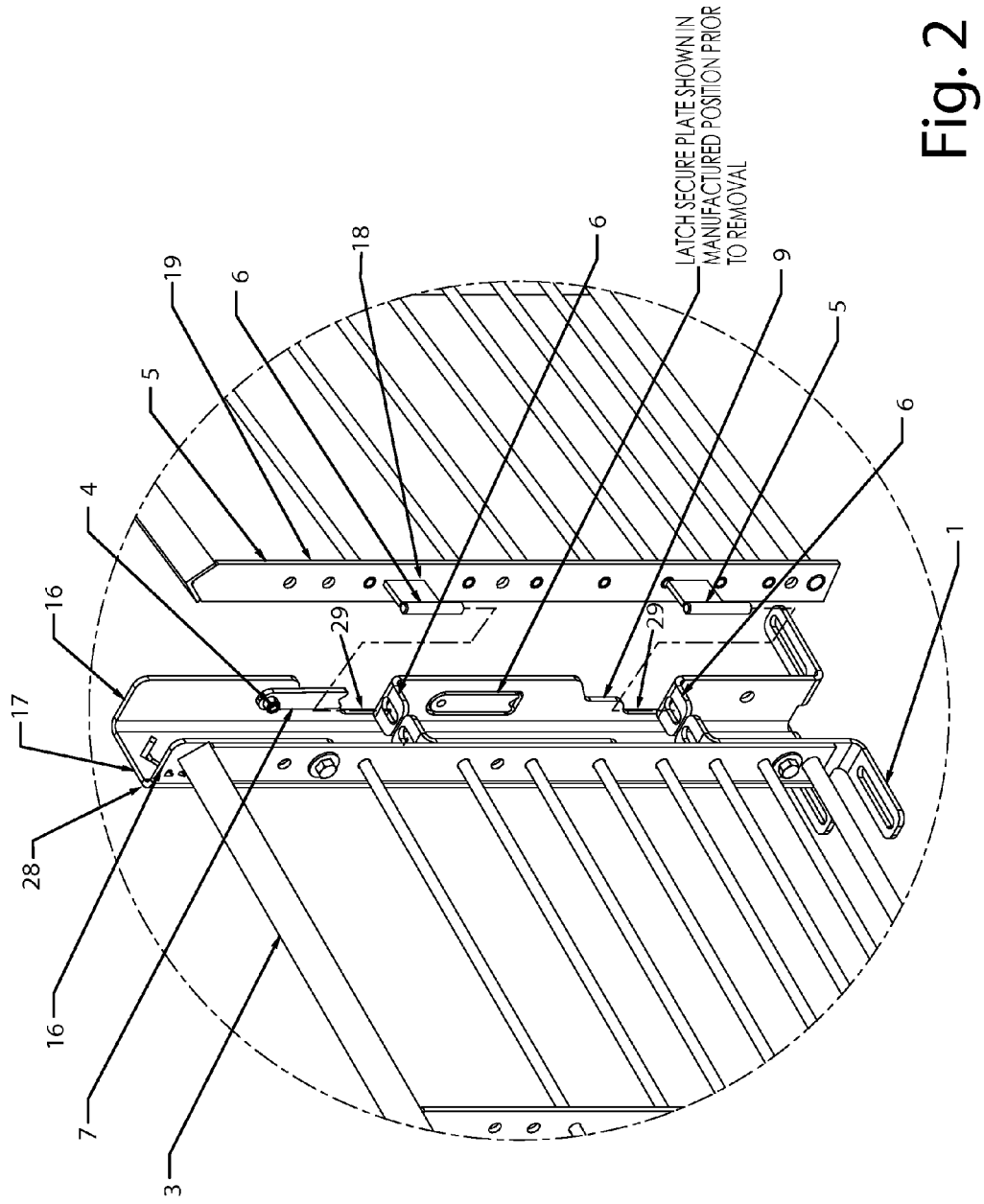
FIG. 2 is a close up view of the hinge and latch system of detail 1 in FIG. 1.
Figure 3:
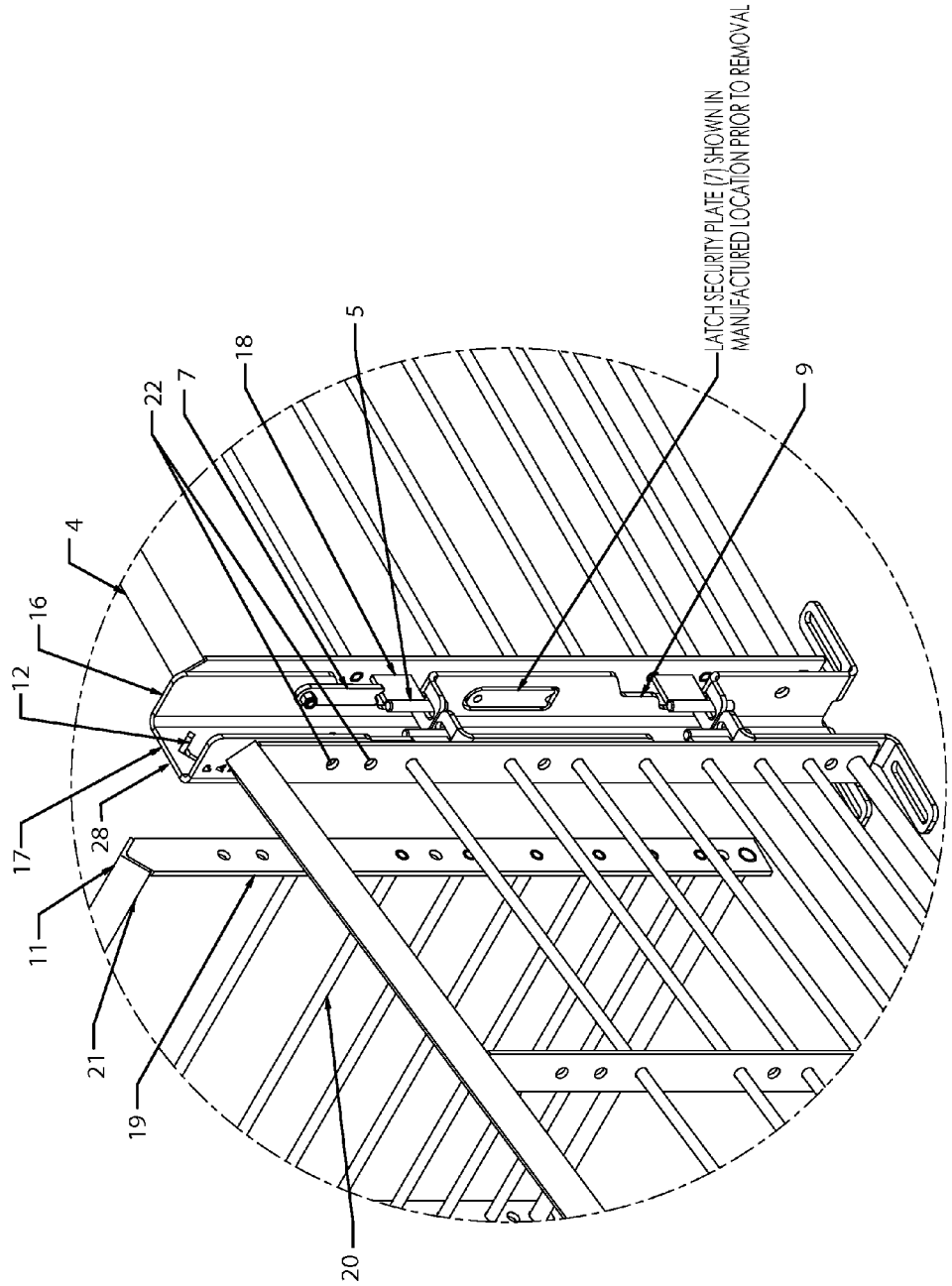
FIG. 3 is a close up view of the hinge and latch system of detail 2 in FIG. 1.

Referring now to FIG. 1, an embodiment of the present invention is illustrated in combination with a livestock pen, optionally for swine. The livestock pen includes stationary alley gates (3) and swinging alley gates (4). The alley gates (3), (4) extend upwardly from a concrete floor (2), and are separated by formed brackets (28). The formed brackets (28) include a vertical web (17) and at least one vertical flange (16). As shown in FIGS. 2-3, for example, the bracket (28) includes two vertical flanges (16) that are spaced apart from each other, while in FIG. 4 the bracket (28) includes only a single vertical flange (16). The alley gates (3), (4) include a vertical upright (19) formed of a flat bar with a striker plate (18) and a hinge element, optionally a hinge pin (5). The vertical upright (19) is illustrated in FIG. 2, and is optionally about ¼" thick and about 1"-2" wide. The vertical upright (19) is interconnected to the alley gate (4) such that one wide side of the upright (19) is exposed to the area going away from the alley gate; it is on this exposed surface where the striker plate (18) is attached to the vertical upright (19). The striker plate (18) is optionally made of steel about ¼" thick and about 2" square. The striker plate (18) is mounted perpendicular to the upright (19) in the longitudinal center of the upright. There may be one or more striker plates (18) interconnected to the vertical upright (19) of an alley gate (4). The hinge pin (5) is optionally cut about 3" long from round bar that is optionally about ½" in diameter. The hinge pin (5) is mounted to the end of the striker plate (18) which is furthest from the gate (4). The hinge pin (5) is longer than the striker plate (18) for the purpose of extending vertically past the striker plate when the hinge pin (5) is mounted such that the top of hinge pin is level with the top of the striker plate (18).

As further shown in FIG. 2, the striker plate (18) extends outwardly from the upright (19), being cantilevered thereto. The striker plate (18) is optionally a planar element that is oriented vertically to define a height greater than a width. The striker plate (18) is integrally formed with the upright (19) in some embodiments, while in other embodiments the striker plate (18) is formed and subsequently joined to the upright (19), optionally involving a welding operation. As also shown in FIG. 2, the hinge pin (5) extends below the lowermost extent of the striker plate (18), being rigidly joined to the striker plate (18) distal from the upright (19). In some embodiments the striker plate (18) and the hinge pin (5) are separate elements, while in other embodiments the striker plate (18) and the hinge (5) form a unitary construction, for example a vertical protrusion (5) extending downwardly from the lowermost extent of a cantilevered member (18).

The striker plate (18) and hinge pin (5) of the gate (4) interact with the bracket (28) of the current embodiment to allow a gate to hinge from or be opened and closed from either end, provided that this bracket (28) or a conventional hinging and latching device is located at the opposing end of the gate. In the gate's closed position, the hinge pins (5) are inserted into apertures (10), generally holes or slots, in the latch tabs (6) which are folded inward from the vertical flange (16) facing the gate (4) in a manner that the latch tabs (6) are generally located on the side of the vertical flange (16) that is opposite the vertical upright (19) of the gate (4). The latch tabs (6) may also be separately manufactured and interconnected to the vertical flange (16) so that the latch tabs (6) are primarily located on the opposite side of the vertical flange (16) from the vertical upright of the gate (4) and not substantially protruding from the gate side of the vertical flange (16) so that they may risk causing injury to persons or livestock passing through an open gate.

Figure 4:
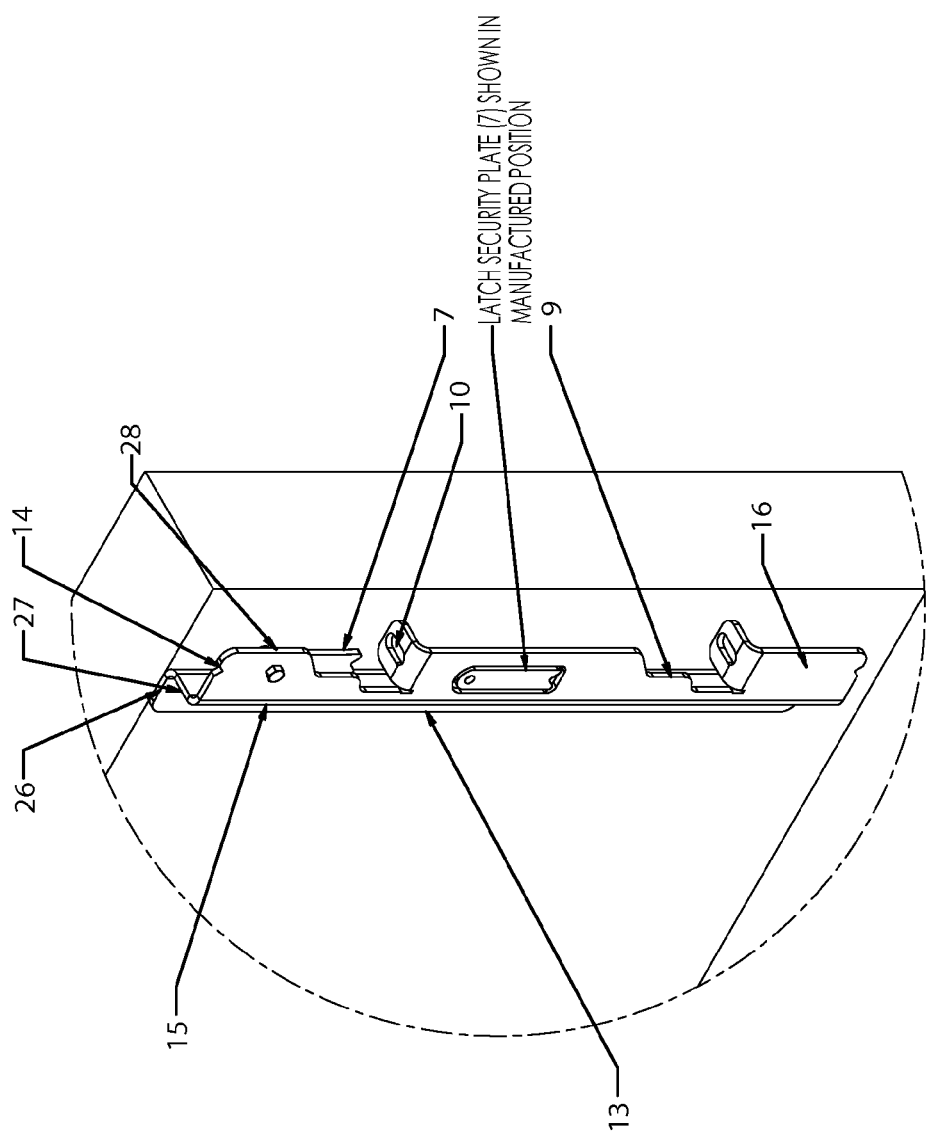
FIG. 4 is a close up view of the hinge and latch system of detail 3 in FIG. 1.

As shown in FIGS. 2-4, the latch tabs (6) are horizontally recessed within the formed bracket (28). The latch tabs (6) therefore do not extend into the gateway defined between opposing formed brackets (28). Where multiple latch tabs (6) are implemented, the latch tabs (6) are oriented in vertical spaced relation relative to each other. In corresponding fashion, the latch tab apertures (10) are oriented in vertical spaced relation relative to each other. The latch tabs (6) are integrally formed with the vertical upright (19) in some embodiments, being bent horizontally for receipt of the hinge pin (5) therein. In other embodiments the latch tabs (6) are separately formed or machined and subsequently joined to the vertical upright (19). The hinge pin (5) is adapted to pivot with respect to the aperture (10) when seated in the aperture (10), in which instance the upper surface of the latch tab (6) is a bearing surface for the striker plate (18). The latch tab apertures (10) extend from an upper surface thereof to a lower surface thereof, such that the apertures (10) define a through hole for the hinge pin (5). The hinge pin (5) optionally extends entirely through the aperture (10), while in other embodiments the hinge pin (5) extends only partially into the aperture (10). Still further optionally, the hinge element (5) can constitute a sleeve including an internal bore that is sized to fit over a post. The post can extend vertically from the latch tab (6) in some embodiments, while in other embodiments the post is co-planar with the vertical flange (16). That is, the vertical flange (16) is generally free from a horizontal latch tab (6), and instead defines a post that is integrally formed with the vertical flange (16) while not protruding into the gateway. In these and other embodiments, the hinge element (5) and the corresponding hinge portion of the vertical flange (e.g., latch tab aperture (10), latch tab post, or vertical flange post) vertically engage each other while maintaining freedom of rotation relative to each other, such that the hinge element (5) can rotate relative to the corresponding hinge portion of the vertical flange either as a male pivot fitting or as a female pivot fitting.

A latch security plate (7) is pivotally connected to the vertical flange (16) by a pin or bolt (8) and shaped in a manner so that it is positioned by gravity in a vertical orientation above the latch tabs (6), with the centerline of the latch security plate (7) generally aligned with the center of the aperture (10) in the latch tabs (6). The latch security plate (7) is generally located on the side of the vertical flange (16) opposite the gate, but may be located on the same side as the gate. With a gate closed so that the hinge pins (5) are fully engaged with the latch tabs (6) and the striker plates (18) are resting on the latch tabs (6), the bottom of the latch security plate (7) is positioned close enough to the uppermost striker plate (18) so that it will stop the gate from being lifted high enough to disengage the hinge pins (5) from the apertures (10) in the latch tabs (6).

More particularly, and with reference to FIGS. 2-3, the latch security plate (7) is pivotably coupled to the vertical flange (16) about a horizontal pivot axis. The latch security plate (7) is optionally an elongate member with a notch (29) formed on a distal end portion thereof, the notch (29) being sized to loosely extend over a portion of the upper periphery of the striker plate (18) when the gate is closed (FIG. 3). Because the latch security plate (7) is pivotably coupled to the vertical flange (16), the gate (4) is allowed to hinge relative to the vertical flange (16). That is, the striker plate (18) is restrained by the latch security plate (7) only in the vertical direction, but not in the lateral directions. The latch security plate (7) is manually pivotable to allow movement of the striker plate (18) in the vertical direction, for example to unlatch the gate (4) from the vertical flange (16). As noted above, the latch security plate (7) hangs freely about a pin or a bolt (8) immediately above the latch tab (6). As generally shown in FIG. 2, the vertical flange (16) can include a latch security plate (7) for only one latch tab (6), while in other embodiments the vertical flange (16) includes a latch security plate (7) for each latch tab (6).

To open the swinging gate (4), the latch security plate (7) is rotated sufficiently clockwise or counterclockwise so that the striker plate (18) will clear the latch security plate (7) when the swinging gate (4) is lifted until the gate hinge pins (5) are disengaged from the apertures (10) of the latch tabs (6). This allows the gate (4) to be swung open. When the latch security plate (7) is released it will be returned to its original position by gravity. When closing the swinging gate, the gate's striker plate (18) strikes the latch security plate (7), rotating it towards the rearward vertical web (17) of the formed bracket. The vertical flange (16) additionally defines an alignment notch (9) to accommodate the striker plate (18) therein. The gate alignment notch (9) in the vertical flange facing the gate prevents the swinging gate from being swung beyond the apertures (10) in the internal latch tabs. The hinge pins (5) of the swinging gate (4) will then align with the apertures (10) in the internal latch tabs (6) and allow the hinge pins (5) to enter into the apertures (10) in the internal latch tabs (6). Once the hinge pins (5) are inserted into the apertures (10) of the internal latch tabs (6), the swinging gate (4) drops down until the striker plates (18) rest on the internal latch tabs (6). The latch security plate (7) then will be returned to its original position by gravity.

Figure 6:
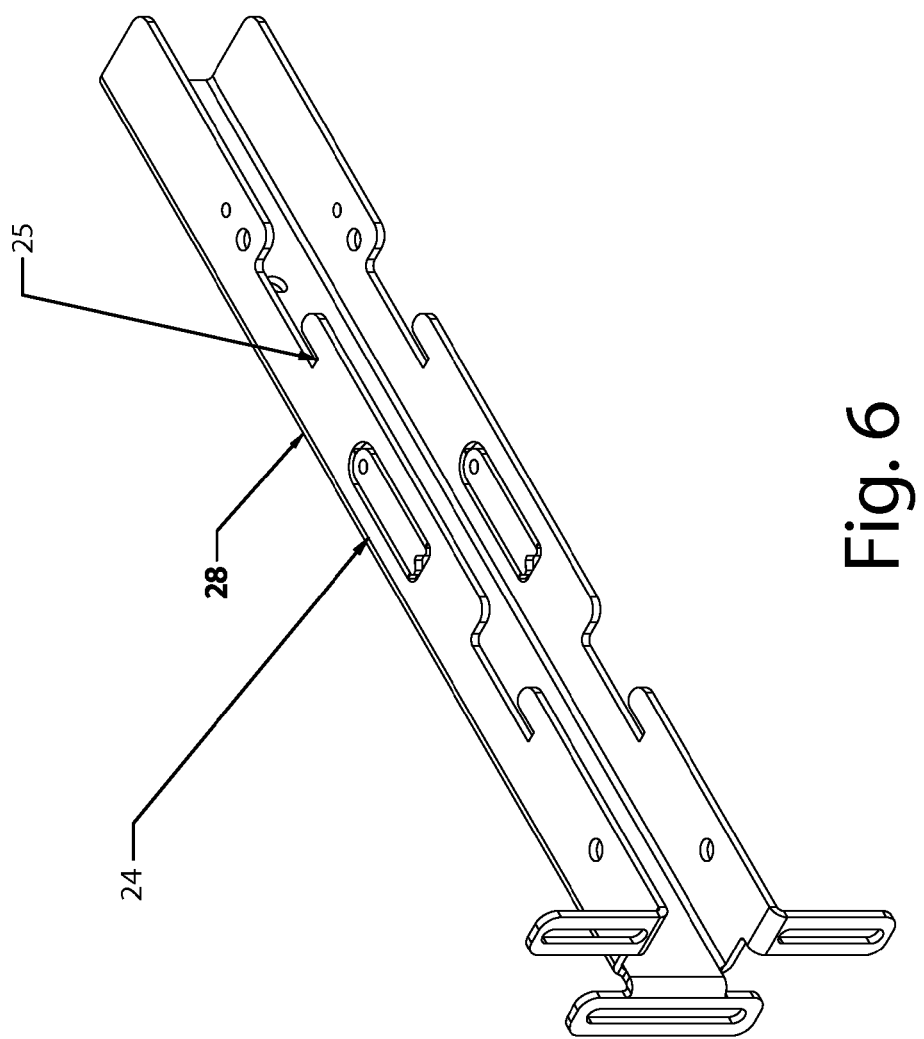
FIG. 6 is an isometric view of a formed bracket with integral tabs used for mounting the bracket as a post to the floor.

The hinge and latch system of the current embodiments may also use vertical slots (25) formed in the vertical flange (16) to receive the striker plates (18) instead of using formed internal latch tabs (6). For example, the post (24) in FIG. 6 includes vertical slots (25) with a sufficient depth and position so that the latch security plate (7), while positioned in its natural vertical orientation by gravity, retains the striker plates (18) within the vertical slots (25) when the gate is lifted. The vertical slots (25) are made with a width narrower than the latch security plate and wide enough that the striker plates (18) may be inserted and removed without appreciable resistance. A gate with its striker plates (18) engaged in the vertical slots (25) may be allowed to hinge about a vertical axis within a limited range defined by the angle of the closed gate and the angle that the striker plates (18) bind in the vertical slots (25). The device with vertical slots may also be used on both ends of a gate where the gate does not need to swing, but is required to be easily removable. The gate alignment notch is used in the same manner on a bracket with vertical slots as a bracket with latch tabs.

The hinge and latch system of the current embodiments is optionally manufactured in such a way that a single part, with only cutting, bending, and finishing processes, may be sent to the point of use. The bracket (28) is generally formed from one piece of sheet metal, typically steel or stainless steel, approximately ¼" thick. The latch security plate (7) can be cut into a portion of the bracket (28) that will retain sufficient strength when the latch security plate is removed. Small tabs are left during the cutting process for the latch security plate to remain interconnected until it is removed during installation and bolted into its functional position. The bracket (28) may also be manufactured of separately manufactured and interconnected components.

The bracket (28) includes at least one additional vertical web (17), which is generally folded from the same piece of material as the other vertical flanges (16), approximately perpendicular to the vertical flange (16). The additional web (17) can contain holes or shaped apertures used for connecting the bracket (28) to stationary fixtures. A common design of gates for swine containment consists of a plurality of rods (20), with a diameter of approximately one half to one inch, oriented horizontally and inserted through and welded to vertical uprights (19) which hold the gate rods (20) spaced apart and vertically aligned. On top of the uprights (19) an angle iron (21) is welded with the legs of the angle pointed downward as shown in the drawings. The bracket (28) may include holes (22) and shaped apertures (12) with sufficient spacing to accept the gate rods (20) and top angle (21) of a common swine containment gate, being slid into the holes (22) and shaped apertures (12). The shaped aperture (12) can be an angled slot (12) formed in a vertical web (17) of the device. The gate rods (20) and top angle (21) can then be welded to the vertical web (17). A stationary gate (3), in this instance a pen divide line gate (11), may bolt directly to the outside of a vertical web (17) through its end vertical upright (19).

In some embodiments the bracket (28) is attachable to a wall. In these embodiments, the bracket (28) includes a wall mount (13), illustrated in FIG. 4. The centerline of the closed swinging gate (4) is approximately perpendicular to the wall, and anchor holes (15) are provided to affix the bracket (28) to the wall with anchor bolts in a second vertical flange (26) that is formed parallel to (and offset from) the vertical flange (16) and interconnected by a vertical web (27) perpendicular to both flanges. The anchor holes (15) are offset relative to the swinging gate's centerline to reduce concrete spalling or cracking when the alley post is close to a door opening.

In some embodiments the bracket (28) can be affixed to a floor, so that it may serve as a freestanding gate post to which gates may latch to and hinge from and to which stationary gates may be affixed. For example, the bracket (28) can include a plurality of external floor tabs (1) with apertures formed therein in the form of holes or slots. In general, one floor tab (1) is formed outwardly from each vertical flange from a single piece of steel, however a separately manufactured base plate may be interconnected to the bottom of the device in lieu of the floor tabs (1).

Figure 5:
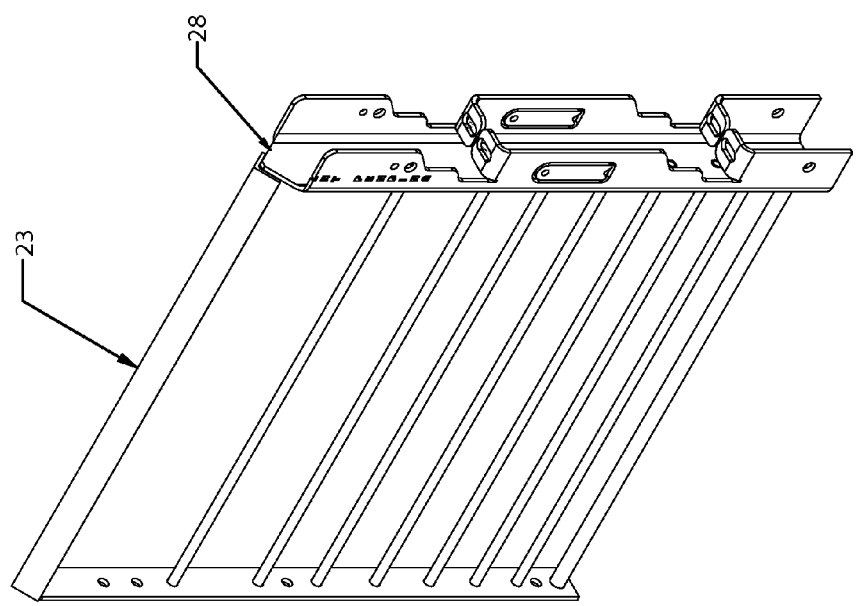
FIG. 5 is an isometric view of the hinge and latch system integrated in a bracket interconnected to a gate.

A plurality of the latching assemblies, including a vertical flange (16), a latch security plate (7), and a latch tab (6) or a vertical slot (25), may be integrated into a single bracket (28), optionally with two, three, or four latching assemblies. The latching assemblies may be integrated into an extruded or formed tube with generally three or more sides. Further optionally, two latching assemblies can be integrated into a single vertical flange (16) that is formed into a channel with the web (17) of the channel containing apertures for connecting the bracket to a gate or fixture as described above. This channel with two integral latching devices can have floor tabs (1) formed therein to create a freestanding post. Still further optionally, the bracket (29) may be integrally formed with a stationary gate (23) as illustrated in FIG. 5. The device may also be manufactured with a built in alignment feature, which consists of a notch (14) in the uppermost or bottommost edge, or both, of the vertical flange (16) whose center is aligned with the center of the apertures in the latch tabs (6) or the center of the vertical slots (25), to allow the bracket to be aligned with other devices on a common centerline during installation. This allows the installer to easily align the devices along a straight line.

To supplement the above description, the below reference numbers are recited as they appear in FIGS. 1-6.

1—External Floor Tabs
  2—Concrete Floor
  3—Stationary Alley Gate
  4—Swinging Alley Gate
  5—Gate Hinge Element (e.g., Pin or Sleeve)
  6—Internal Latch Tab
  7—Latch Security Plate
  8—Bolt, Flat Washers and Locknut
  9—Gate Alignment Notch
  10—Apertures of the Internal Latch Tab
  11—Pen Divide Line Gate
  12—Angled Slot
  13—Formed Bracket (Wall Mount)
  14—Construction Alignment Notch
  15—Bracket Anchor Mounting Holes
  16—Vertical Flange of Formed Bracket
  17—Vertical Web of Formed Bracket
  18—Striker Plate
  19—Vertical Upright of Gate
  20—Gate Rods
  21—Gate Top Angle
  22—Rod Holes in Web
  23—Gate with Formed Bracket Attached
  24—Post without Latch Tabs
  25—Vertical Slot in lieu of Latch Tab
  26—Second Vertical Flange of Wall Mount Bracket
  27—Vertical Web of Wall Mount Bracket
  28—Formed Bracket
  29—Latched Security Plate Notch The above description is that of current embodiments. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the," or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A hinge and latch system for a livestock gateway facility comprising:
   a gate including an upright, a striker plate extending from the upright, and a hinge pin joined to the striker plate distal from the upright;
   a vertical flange bordering the gateway and including a gate alignment notch to accommodate the striker plate therein and a horizontal latch tab defining an aperture; and
   a latch security plate that is suspended vertically above the latch tab and is pivotable about a horizontal pivot axis to pivot clear of the latch tab;
   wherein the latch tab extends horizontally in a direction opposite of the gateway such that the latch tab does not extend into the gateway,
   wherein the latch security plate is pivotable laterally about the horizontal pivot axis in response to contact from the striker plate to allow entry of the hinge pin into the latch tab aperture,
   wherein the latch tab includes an horizontal bearing surface, the striker plate abutting the horizontal bearing surface when the hinge pin is received within the latch tab aperture, and
   wherein the latch security plate automatically returns to a vertical position to retain the hinge pin within the latch tab aperture after closing of the gate against the vertical flange.

2. The hinge and latch system of claim 1 wherein the latch tab is integrally formed with the vertical flange and adjacent the gate alignment notch.

3. The hinge and latch system of claim 1 wherein the hinge pin is rigidly coupled to the striker plate and extends below the lowermost extent of the striker plate.

4. The hinge and latch system of claim 1 wherein the striker plate is a planar element that is oriented vertically to define a height greater than a width.

5. A swinging gate assembly for a livestock gateway, comprising:
   first and second vertical flanges bordering the gateway and each including:
      a horizontal latch tab defining a slot therein, the latch tab extending horizontally in a direction opposite of the livestock gateway, a latch security plate suspended vertically above the latch tab and pivotable about a horizontal pivot axis to swing clear of the latch tab and to automatically return to a vertical position over the latch tab, and a gate alignment notch between the horizontal latch tab and the latch security plate; and
   a gate extending into the livestock gateway between the first and second vertical flanges, the gate including a first hinge pin and a first striker plate at a first lateral end thereof and a second hinge pin and a second striker plate at a second lateral end thereof, the first and second striker plates causing the latch tabs of the first and second vertical flanges to pivot clear of the gate alignment notch to permit the hinge pin of the first and second vertical flanges to engage the latch tab slot of the first and second vertical flanges, respectively;
   wherein the gate is rotatable about the first hinge pin between an open position and a closed position when the first hinge pin is received within the latch tab slot of the first vertical flange, wherein the gate is rotatable about the second hinge pin between an open position and a closed position when the second hinge pin is received within the latch tab slot of the second vertical flange, and wherein removal of the first and second hinge pins from the latch tab slots is obstructed by the latch security plates until the latch security plates are pivoted from the vertical position.

6. The swinging gate assembly of claim 5 wherein the first vertical flange latch tab is disposed horizontally from the first vertical flange.

7. The swinging gate assembly of claim 5 wherein the first vertical flange forms part of a freestanding bracket or a wall-mounted bracket.

* * * * *

UNITED STATES PATENT AND TRADEMARK OFFICE
CERTIFICATE OF CORRECTION

| | | |
|---|---|---|
| PATENT NO. | : 9,238,928 B2 | Page 1 of 1 |
| APPLICATION NO. | : 14/159502 | |
| DATED | : January 19, 2016 | |
| INVENTOR(S) | : Terry L. Johnson | |

It is certified that error appears in the above-identified patent and that said Letters Patent is hereby corrected as shown below:

IN THE CLAIMS

Column 8, Claim 1, Lines 4-5

"1. A hinge and latch system for a livestock gateway facility comprising:"

should be

-- 1. A hinge and latch system for a livestock gateway comprising: --

Signed and Sealed this
Third Day of May, 2016

Michelle K. Lee
*Director of the United States Patent and Trademark Office*